W. K. CLEVELAND.
DRIVE GEARING.
APPLICATION FILED JULY 24, 1916.
1,221,680.
Patented Apr. 3, 1917.
2 SHEETS—SHEET 1.
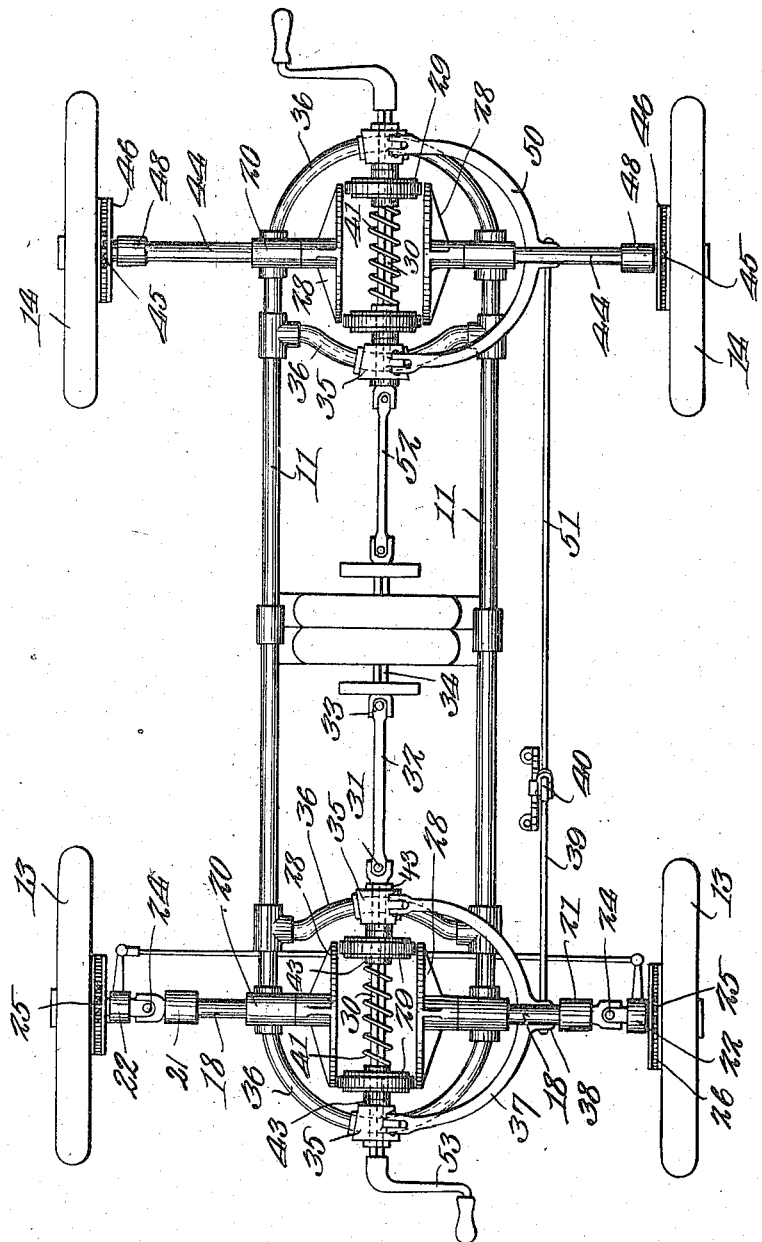

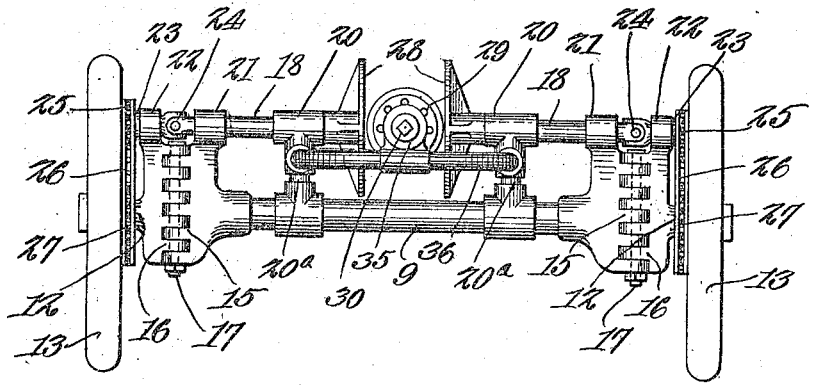

UNITED STATES PATENT OFFICE.

WILLIAM K. CLEVELAND, OF TAMPA, FLORIDA, ASSIGNOR OF ONE-HALF TO C. W. KENNON, OF HILLSBOROUGH COUNTY, FLORIDA.

DRIVE-GEARING.

1,221,680.   Specification of Letters Patent.   Patented Apr. 3, 1917.

Application filed July 24, 1916. Serial No. 110,941.

*To all whom it may concern:*

Be it known that I, WILLIAM K. CLEVELAND, a citizen of the United States, residing at Tampa, in the county of Hillsborough and State of Florida, have invented certain new and useful Improvements in Drive-Gearing, of which the following is a specification.

This invention relates to driving gear for motor vehicles, and its object is to provide a simple, strong, efficient and easily controlled friction gear which is so constructed and arranged that the car can be perfectly controlled by a single hand lever.

The invention also has for its object to provide a novel and improved arrangement of shafts associated with the gearing, and so arranged with respect to the axles of the car, that the latter are braced and given greater strength.

Other objects and advantages of the invention will be pointed out in the detailed description appearing hereinafter, and in order that the same may be better understood, reference is had to the accompanying drawings forming a part of this specification.

In the drawings, Figure 1 is a plan view of the running gear of the car, showing the application of the invention; Fig. 2 is a front elevation, and Fig. 3 is a rear elevation.

Referring specifically to the drawings, the running gear of the car is composed of a front axle 9, a rear axle 10, and laterally spaced reaches 11 connecting the same. The front axle carries pivot axles or spindles 12 at its outer ends, for the front wheels 13. The hind wheels are shown at 14.

At the outer ends of the front axle 9 are knuckles 15 which match with knuckles 16 on the spindles 12, and are pivotally connected by a pivot bolt or pin 17. The front wheels may therefore be swung in the usual manner to steer the car, a suitable steering gear being provided, which latter has not been illustrated as it forms no part of the present invention.

Above the front axle 9 are located two axially alined jack shafts 18 which are supported at their inner ends in bearings 20 carried by struts 20ª fixed on the axle and rising therefrom. At the top of the knuckles 15 are bearings 21 for supporting the outer ends of the jack shafts. Opposite the bearings 21, the knuckles 16 have bearings 22 supporting short shafts 23 connected to the respective jack shafts by universal joints 24. The shafts 23 are also provided with sprocket wheels 25 connected by chains 26 with sprocket wheels 27 fast on the hubs of the respective wheels 13, the latter running free on the spindles 12. This sprocket-and-chain gearing drives the wheels 13 from the jack shafts 18, the joints 24 permitting the wheels to be swung to steer the car without breaking or interfering with the drive.

On the inner end of each jack shaft 18 is fixed a friction disk 28 between which are located friction wheels 29, the latter being positioned on opposite sides of the center of the friction disks. The friction wheels are carried by a shaft 30 having a universal joint connection 31 with a drive shaft 32, the latter, in turn, being connected by a universal joint 33 with the engine crank shaft 34. The engine is an internal-combustion engine. There is sufficient space between the friction disks to allow the shaft 30 to be swung to place the friction wheels in driving engagement with one or the other of the disks, to obtain a forward and a reverse drive. When the front friction wheel is in contact with the friction disk at the left, and the rear friction wheel is in contact with the friction disk at the right, the jack shafts 18 are driven in one and the same direction, but when the shaft 30 is swung sidewise to bring the front friction wheel in contact with the right friction disk, and the rear friction wheel in contact with the left friction disk, the motion of the jack shafts will be reversed.

In order that the shaft 30 may be operated in the manner stated, it is supported in front and rear bearings 35 which are slidably mounted on guide bars 36, the guide for the bearing at the forward end of the shaft being carried by the struts 20ª, and the other guide being carried by the reaches 11. These guides are curved on arcs having for their center a point located midway between the disks 28 and coinciding with the centers thereof, in view of which the shaft 30 swings about this point, and as the wheels 29 are on opposite sides thereof, they come into driving contact with one or the other of the disks as hereinbefore described when the shaft is shifted sidewise. The universal joint 31 permits this sidewise shift of the shaft 30 without breaking the driving connection with the shaft 32.

In order that the shaft 30 may be shifted for the purpose described, the bearings 35 are connected to the respective branches 37 of a yoke having a stem 38 which is connected by a rod 39 to a hand lever 40.

The friction wheels 29 are slidably mounted on the shaft 30, the latter being square or of other angular cross-section. Any other suitable arrangement may be provided to obtain a driving connection between the shaft and the friction wheels, and to allow the latter to slide on the shaft. Between the friction wheels is positioned a coiled spring 41 which tends to normally spread the same, so that they may engage the friction disks near their peripheries. This is the position of the friction wheels when the car is starting, and in view of the powerful leverage obtained by the position of the friction wheels farthest from the center of the disks 28, the car starts smoothly and without jerks. As the engine picks up speed, and the friction wheels rotate faster, they creep inward toward the center of the disks, thus increasing the speed of the jack shafts 18. This inward movement is against the tension of the spring 41, so that when the engine slows down, the friction wheels are pushed outward by the spring and again assume a position close to the periphery of the friction disks for a slow drive.

The friction drive hereinbefore described does not require a differential, for the reason that when one of the wheels 13 is traveling faster than the other upon making a turn, the corresponding friction disk slips. As the shaft 30 is angular in cross-section, it is fitted with bushings 43 where it passes through the bearings 35. These bushings also serve as stops to limit the outward movement of the friction wheels 29.

The drive can also be employed as an emergency brake, by reversing the position of the friction wheels 29 without stopping the engine.

A friction drive is also provided for the rear wheels 14, each of these wheels being loose on the axle 10, and independently driven. Two jack shafts 44 as before are provided, these being provided with sprocket wheels 45 connected by chains 46 to sprocket wheels 47 fast on the hubs of the wheels 14. The inner ends of these jack shafts are supported in the same manner as the shafts 18, and their outer ends are supported in bearings 48 at the upper ends of struts 49 secured to and rising from the axle 10. The friction gear for driving the jack shafts 44 is the same as the one hereinbefore described, and a yoke 50 is provided for the same purpose as the yoke 37, with a connection by a rod 51 to the hand lever 40, which latter therefore operates both sets of friction wheels simultaneously. The engine crank shaft 34 has a driving connection 52 with the shaft of the rear friction wheels arranged in the same manner as the connection with the shaft of the front friction wheels.

In starting the car, a hand crank 53 may be applied to the outer end of either friction wheel shaft, so that the car can be started from either end. It will be understood, of course, that before starting, the friction wheels must first be placed in neutral position, or out of contact with the friction disks. This can be done irrespective of the particular position of the wheels between the disks, as the diameter of the wheels is less than the width of the space between the disks, and the faces of the latter are plane. Thus when the shaft of the friction wheels is swung straight, the wheels are free of the disks.

By the struts which extend between the axles and the jack shafts, the axles are trussed and given the greatest strength and rigidity.

The preferred embodiment of the invention has been shown, but it will be understood that various changes and modifications may be made without a departure from the spirit and scope of the invention as claimed hereinafter.

I claim:

1. The combination of a drive shaft, axially alined and spaced driven shafts extending transversely of the drive shaft on opposite sides thereof, friction disks on the inner ends of the driven shafts, friction wheels between the disks on opposite sides of the center thereof, said wheels being slidably mounted on the drive shaft and turning therewith, a spring between the friction wheels for yieldingly holding the same spread outward from the center of the disks, shiftable bearings for the drive shaft, and means for shifting the bearings to swing the drive shaft transversely between the disks and alternately engage the friction wheels with the disks.

2. The combination of a drive shaft, axially alined and spaced driven shafts extending transversely of the drive shaft on opposite sides thereof, friction disks on the inner ends of the driven shafts, friction wheels between the disks on opposite sides of the center thereof, said wheels being slidably mounted on the drive shaft and turning therewith, a spring between the friction wheels for yieldingly holding the same spread outward from the center of the disks, bearings for the drive shaft on opposite sides of the center of the disks, curved guides on which the bearings are slidably mounted, the curves being on an arc having for its center a point coinciding with the center of the disks, and midway between the same, and means for shifting the bearings on the guides.

3. The combination of a drive shaft, axially alined and spaced driven shafts extending transversely of the drive shaft on opposite sides thereof, friction disks on the inner ends of the driven shafts, friction wheels between the disks on opposite sides of the center thereof, said wheels being slidably mounted on the drive shaft and turning therewith, resilient means for yieldingly holding the friction wheels spread outward from the center of the friction disks, shiftable bearings for the drive shaft, and means for shifting the bearings to swing the drive shaft transversely between the friction disks and alternately engage the friction wheels with the friction disks.

4. The combination of a drive shaft, axially alined and spaced driven shafts extending transversely of the drive shaft on opposite sides thereof, friction disks on the inner ends of the driven shafts, friction wheels between the friction disks on opposite sides of the center thereof, said friction wheels being slidably mounted on the drive shaft and turning therewith, a spring between the friction wheels for yieldingly holding the same spread outward from the center of the disks, the diameter of the friction wheels being less than the space between the faces of the disks, and said faces being plane, bearings for the drive shaft on opposite sides of the center of the disks, curved guides on which the bearings are slidably mounted, the curves being on an arc having for its center a point coinciding with the center of the disks, and midway between the same, and means for shifting the bearings on the guides.

In testimony whereof I affix my signature.

WILLIAM K. CLEVELAND.

Copies of this patent may be obtained for five cents each, by addressing the "Commissioner of Patents, Washington, D. C."